US00RE37481B1

(19) United States
(12) Reissued Patent
Crossley et al.

(10) Patent Number: US RE37,481 E
(45) Date of Reissued Patent: Dec. 25, 2001

(54) FOLD-UP BATHTUB

(75) Inventors: David W. Crossley, Woonsocket, RI (US); Brian C. Sundberg, Stoughton; Michael S. Bernstein, Natick, both of MA (US)

(73) Assignee: Safety 1st, Inc., Canton, MA (US)

(21) Appl. No.: 08/874,078

(22) Filed: Jun. 12, 1997

Related U.S. Patent Documents

Reissue of:
(64) Patent No.: 5,425,149
Issued: Jun. 20, 1995
Appl. No.: 08/188,088
Filed: Jan. 28, 1994

(51) Int. Cl.[7] ..... A47K 3/064
(52) U.S. Cl. ..... 4/572.1; 4/574.1; 4/575.1; 4/621
(58) Field of Search ..... 4/571.1, 572.1, 4/573.1, 574.1, 575.1, 578.1, 579, 621

(56) References Cited

U.S. PATENT DOCUMENTS

| | | | | |
|---|---|---|---|---|
| D. 288,955 | * | 3/1987 | Greene | D23/52 |
| D. 325,132 | * | 4/1992 | Cone | D6/333 |
| 334,674 | * | 1/1886 | Neal | 4/586 |
| 1,134,364 | * | 4/1915 | Adams | 4/621 |
| 2,850,743 | * | 9/1958 | White | 4/579 X |
| 2,974,322 | * | 3/1961 | Norris | 4/659 |
| 3,545,016 | * | 12/1970 | Schorken | 4/572.1 X |
| 3,995,331 | * | 12/1976 | Fotre et al. | 4/572.1 |
| 4,037,591 | * | 7/1977 | Sarno | 4/573.1 X |
| 4,998,307 | * | 3/1991 | Cone | 5/94 |
| 5,092,004 | * | 3/1992 | Cone et al. | 5/94 |
| 5,115,523 | * | 5/1992 | Cone | 5/94 |

FOREIGN PATENT DOCUMENTS

| | | | | |
|---|---|---|---|---|
| 0036381 | * | 4/1906 | (CH) | 4/585 |
| 0240882 | * | 11/1911 | (DE) | 4/573.1 |
| 0003790 | * | 12/1976 | (WO) | 4/585 |
| 2307509 | * | 12/1976 | (FR) | 4/579 |

* cited by examiner

*Primary Examiner*—Robert M. Fetsuga
(74) *Attorney, Agent, or Firm*—Wolf, Greenfield & Sacks, P.C.

(57) ABSTRACT

A baby bathtub having a base with a reservoir therein in which the baby is supported and an outwardly extending headrest and leg rest that support the baby's head and legs when the baby is in the reservoir. The headrest and leg rest are pivotally connected to the base so that they can move from the extended operative positions to a retracted position over the base for convenient storage or toting of the bathtub.

23 Claims, 6 Drawing Sheets

Fig. 8
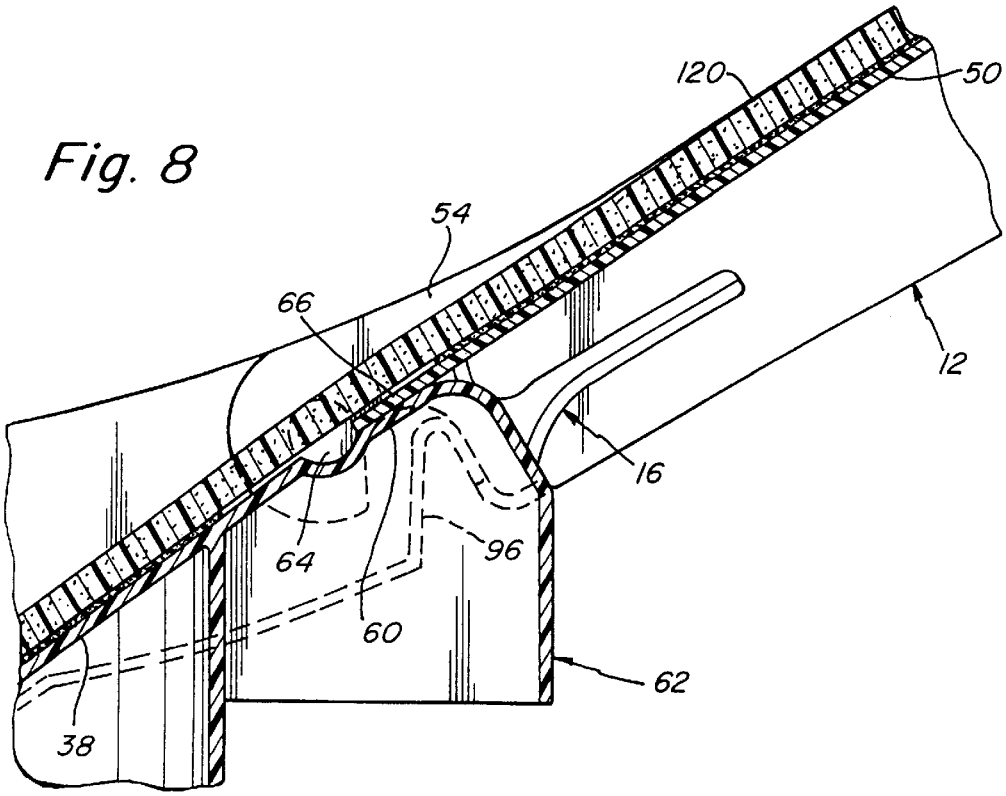
Fig. 9
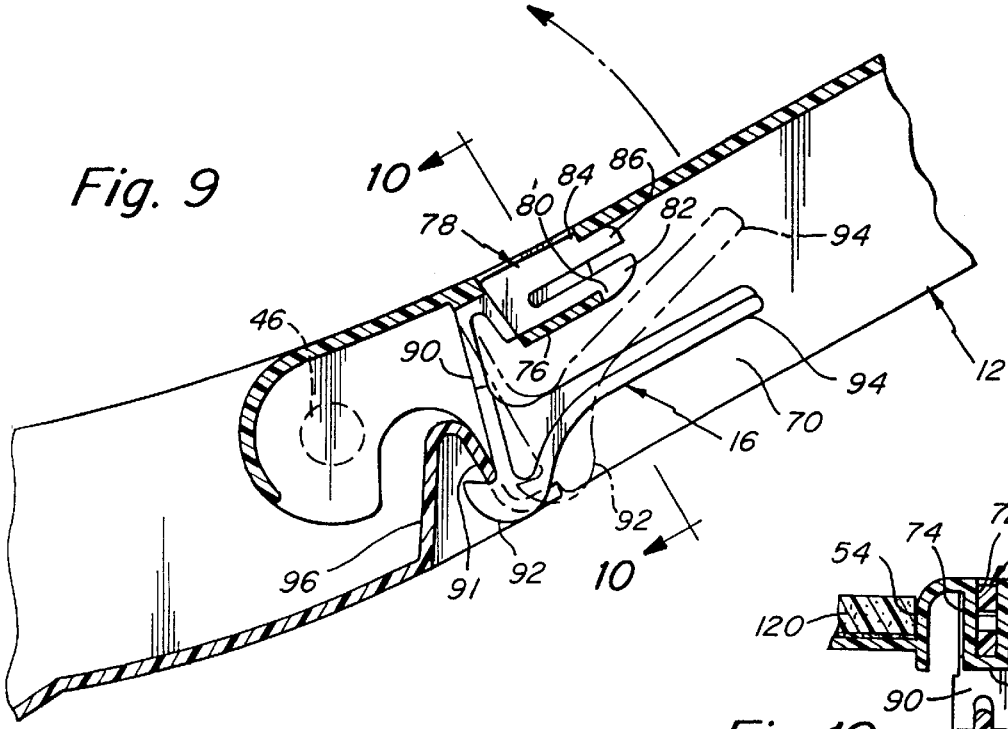
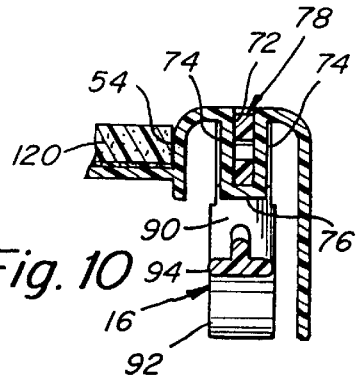
Fig. 10

FOLD-UP BATHTUB

Matter enclosed in heavy brackets [ ] appears in the original patent but forms no part of this reissue specification; matter printed in italics indicates the additions made by reissue.

INTRODUCTION

This invention relates to baby bathtubs to be used on counters or tables or in typical double kitchen sinks or large single tub sinks.

There are a variety of baby bathtubs now on the market for conveniently bathing a baby. However, many of them are relatively large particularly if they are designed to be used for infants that are relatively large, for example, approximately the average size of a six month old. As a result of their large size, they are often inconvenient to tote or store. Moreover, they are not convenient to use in small double sinks. Many of the prior art tubs also lack a suitable basin to hold bathing accessories such as a wash cloth and soap.

The principle object of the present invention is to provide a tub which is large enough to be used with larger infants but which can be folded into a relatively compact size to facilitate toting or storing in a trunk, cabinet or closet.

Another object of the present invention is to provide a foldable baby bathtub which is suitable for use in a single or double kitchen sink without danger to the infant occupying it.

Another object of the invention is to provide a foldable bathtub which can be carried about with an infant in it when the tub is unfolded, without any danger of the tub collapsing.

Yet another object of this invention is to provide a tub that can be manufactured and sold for a modest price and yet provide long and dependable service.

To accomplish these and other objects, the bathtub of the present invention is made of three major parts, namely, a base having the major bathing reservoir in it, and a headrest and a foot rest each pivotally connected to the base. The pivotal connections between the base and the headrest and foot rest enable the two to be folded over the base so that each lies within the perimeter of the base and in the reservoir so that the effective volume of the tub for purposes of storage is essentially only that of the base itself. Latches are provided for securely locking both the headrest and foot rest in the extended or operative position so that the tub will not accidentally fold when in use. The location of the latches renders them inaccessible to the infant in the tub so that that cannot accidentally be released. A cushion pad lines the upper surfaces of the base, headrest and foot rest for maximum comfort of the infant. The surfaces of the three major parts form smooth continuations of one another and are contoured to support the infant in a partially-reclined position. Shoulders are provided on the bottoms of the parts that cooperate with one another so that the tub may be placed in a stable position in either a single or double sink, and a support rim is provided on the base for supporting the tub on a table, counter top or other flat surface.

These and other objects and features of the invention will be better understood and appreciated from the following detailed description read in connection with the accompanying drawings.

BRIEF DESCRIPTION OF THE DRAWINGS

FIGS. 8 and 9 are fragmentary cross-sectional views on an enlarged scale taken along the section lines 8—8 and 9—9 of FIG. 7;

FIG. 10 is a fragmentary cross-sectional view on an enlarged scale taken along section line 10—10 in FIG. 9;

DETAILED DESCRIPTION

Figure 1:
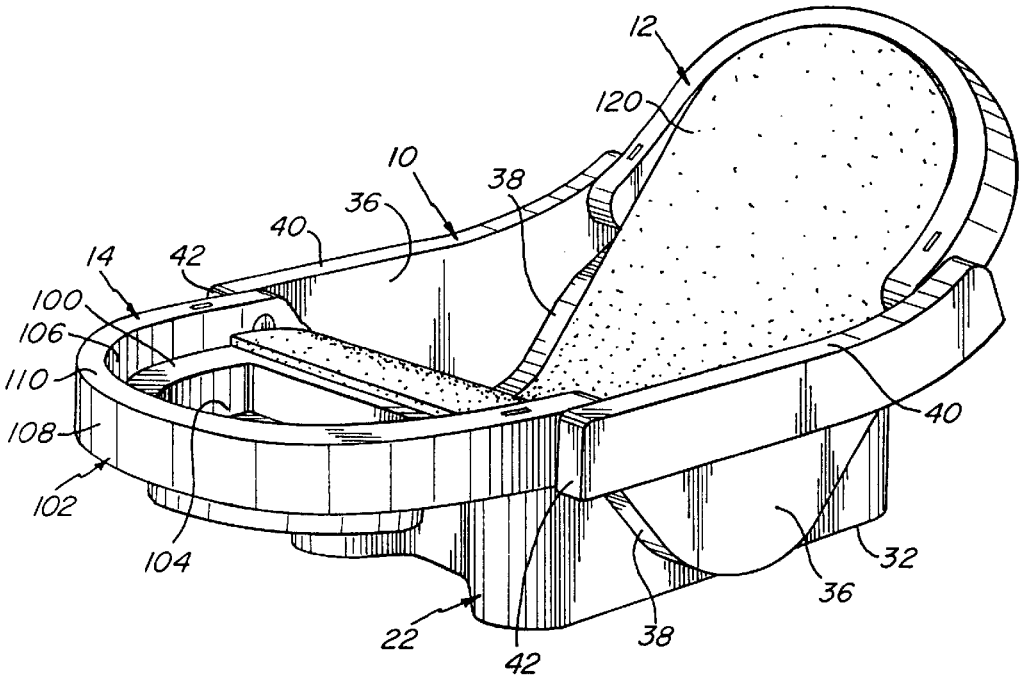
FIG. 1 is a perspective view of the baby bathtub embodying the present invention.
Figure 2:
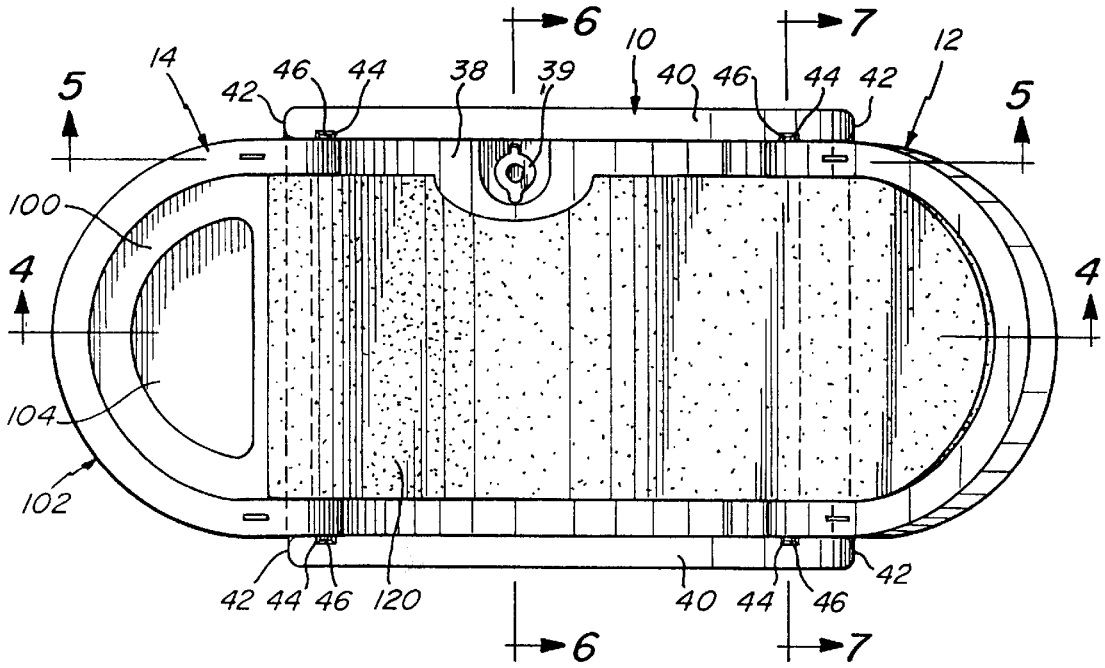
FIG. 2 is a top [plane] *plan* view thereof.
Figure 11:
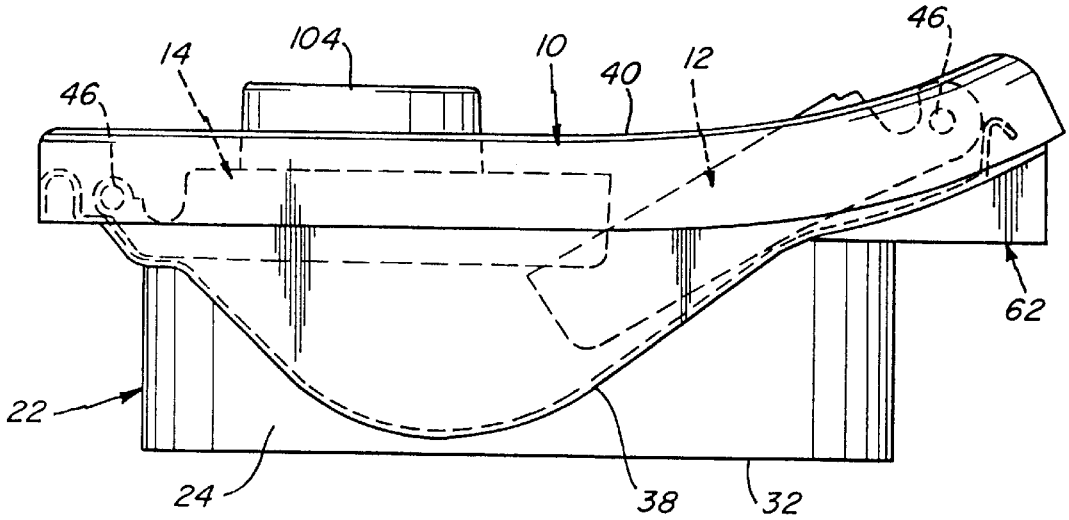
FIG. 11 is side view of the baby bathtub of the present invention shown in the folded position for carrying or storage.

The baby bathtub of the present invention is uniquely constructed so as to provide a large tub volume which is both comfortable and safe for the baby when in use. The tub is capable of being folded into a relatively small volume for convenience when being transported or stored. In FIG. 1 the tub is shown in the open or extended position for use as a baby bathtub and in FIG. 11 the tub is shown folded for transport or storage.

The tub comprises three major parts, namely, a base 10, headrest 12 and leg rest 14. The headrest 12 and leg rest 14 are pivotally mounted on the base 10 so that they can be moved from the extended or operative position of FIG. 1 to the folded position of FIG. 11. The tub includes latches 16 and 18 shown in FIGS. 5, 9 and 10 for releasably locking the headrest 12 and leg rest 14 in their extended positions. The latches 16 and 18 enable the tub to be carried by the headrest and leg rest without collapsing. The various parts of the bathtub assembly are described in detail below.

The base 10 preferably is molded as a one piece plastic structure. The base includes a support rim 22 in the form of a substantially continuous wall having side panels 24 and 26 and transverse walls 28 and 30 at the head and foot ends of the base structure. The walls 24–30 are essentially vertical and have coplanar bottom edges 32 which enable the support rim to provide a stable platform for the base when placed on a surface such as a table or counter top.

Figure 3:
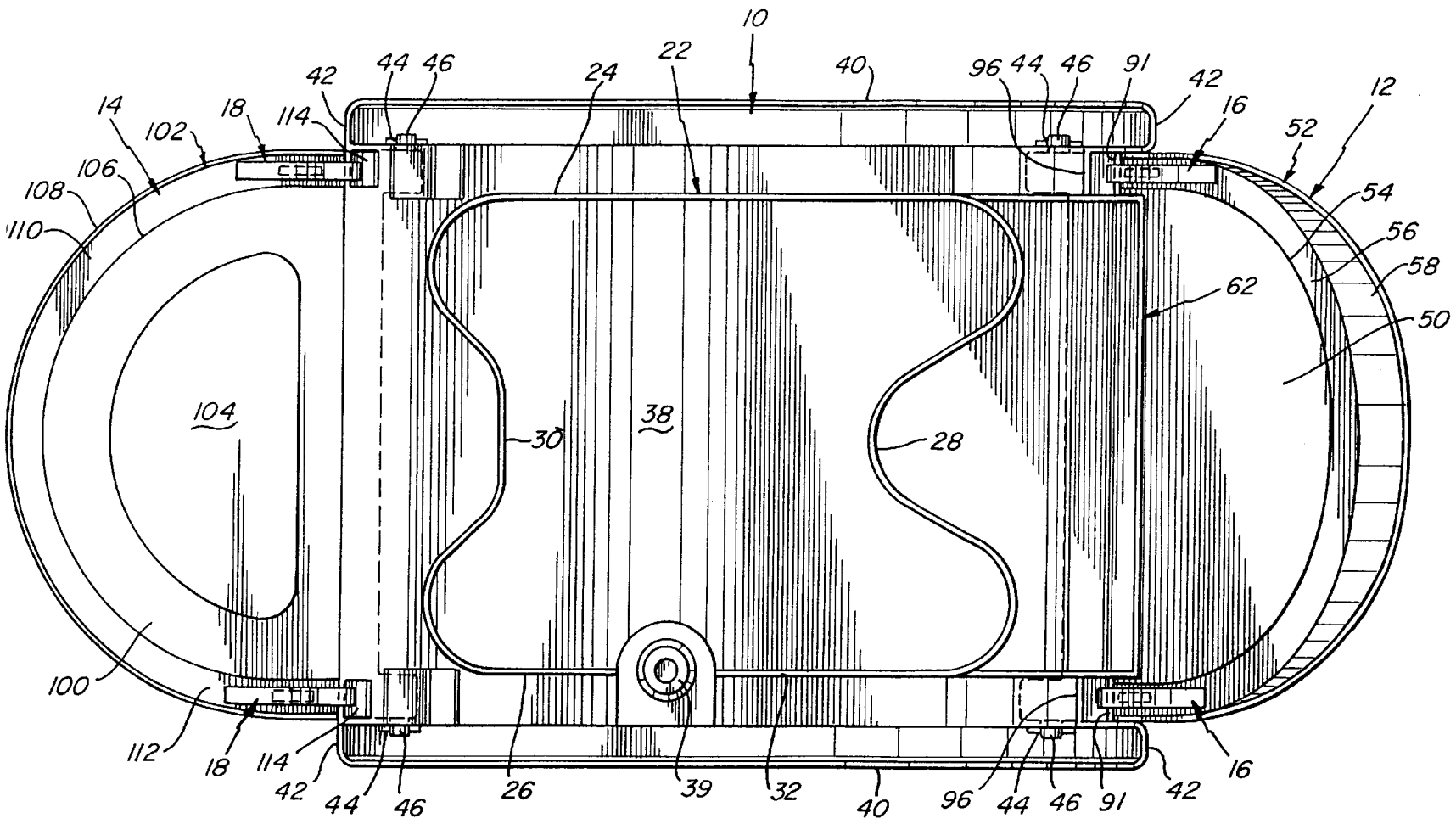
FIG. 3 is a bottom [plane] *plan* view thereof on an enlarged scale.
Figure 4:
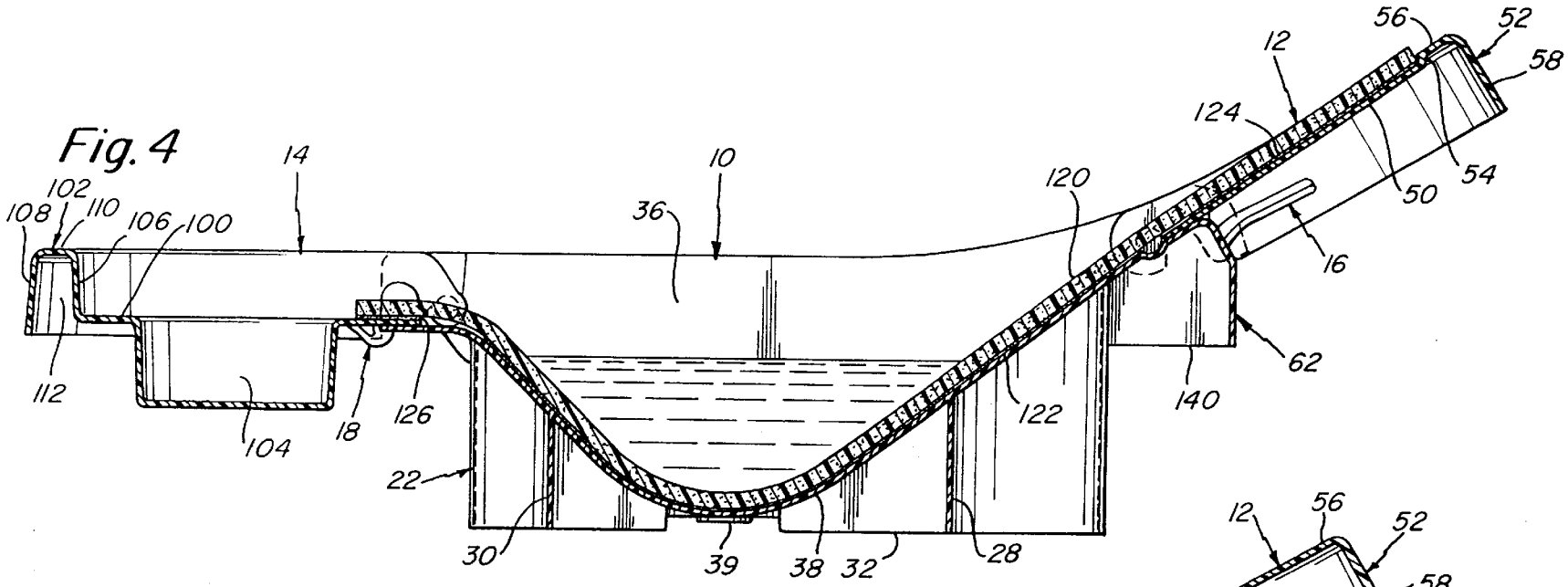
FIGS. 4 and 5 are a cross-sectional side elevation views of the baby bathtub taken along the sections line 4—4 and 5—5, respectively, in FIG. 2.
Figure 5:
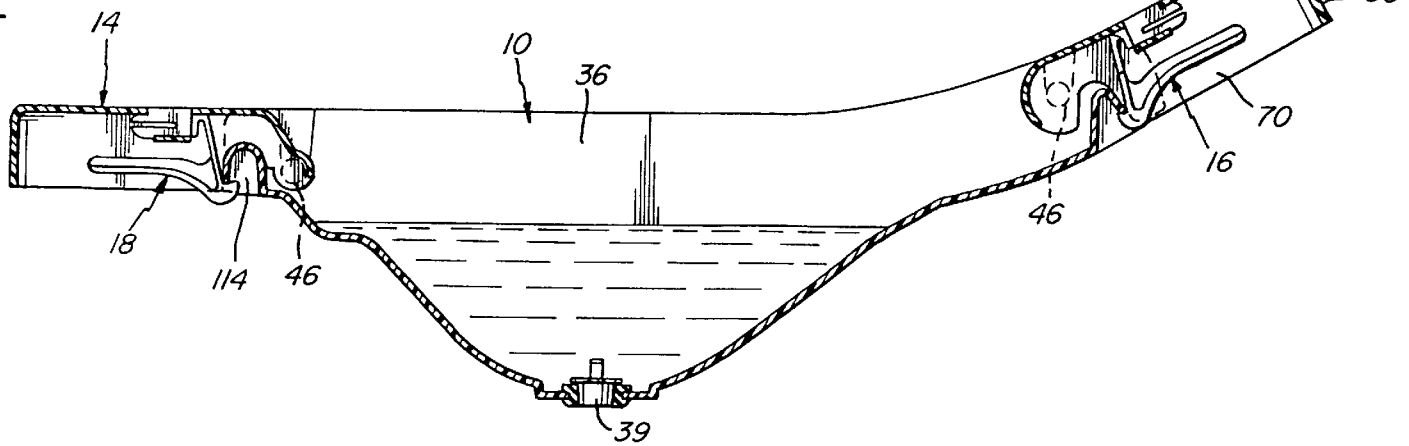

Base 10 has side walls 36 that are disposed upwardly of the side walls 24 of the support rim 22. A contoured bottom wall 38 joins the bottom of the side walls 36 and the top of the support rim 22 and defines the supporting surface for the baby when placed in the tub. The bottom wall 38 is generally V-shaped with a rounded apex so as to define a comfortable supporting surface for the baby in a partially reclined position. The side and bottom walls 36 and 38 define the tub proper which contains the bath water as shown in FIGS. 4 and 5. A drain 39 is provided at the low point of the bottom wall for emptying the tub. The tops of the side walls 36 carry flanges 40 that extend outwardly and then downwardly to define a skirt above the top of the side walls which would rigidify the structure and provide comfortable arm rests for the baby in the tub. As shown in FIGS. 1 and 3, the ends of the skirt 40 adjacent the headrest 12 and leg rest 14 are closed by the flanges 42. The side walls 36 of the base 10 at their head and foot ends and adjacent the skirts 40 contain sockets 44 for receiving hinge pins 46 that are carried by the headrest 12 and leg rest 14 as is explained more fully below. The sockets 44 and hinge pins 46 allow the headrest and leg rest 12 and 14 to pivot between the positions shown in FIG. 1 and FIG. 11.

Figure 7:
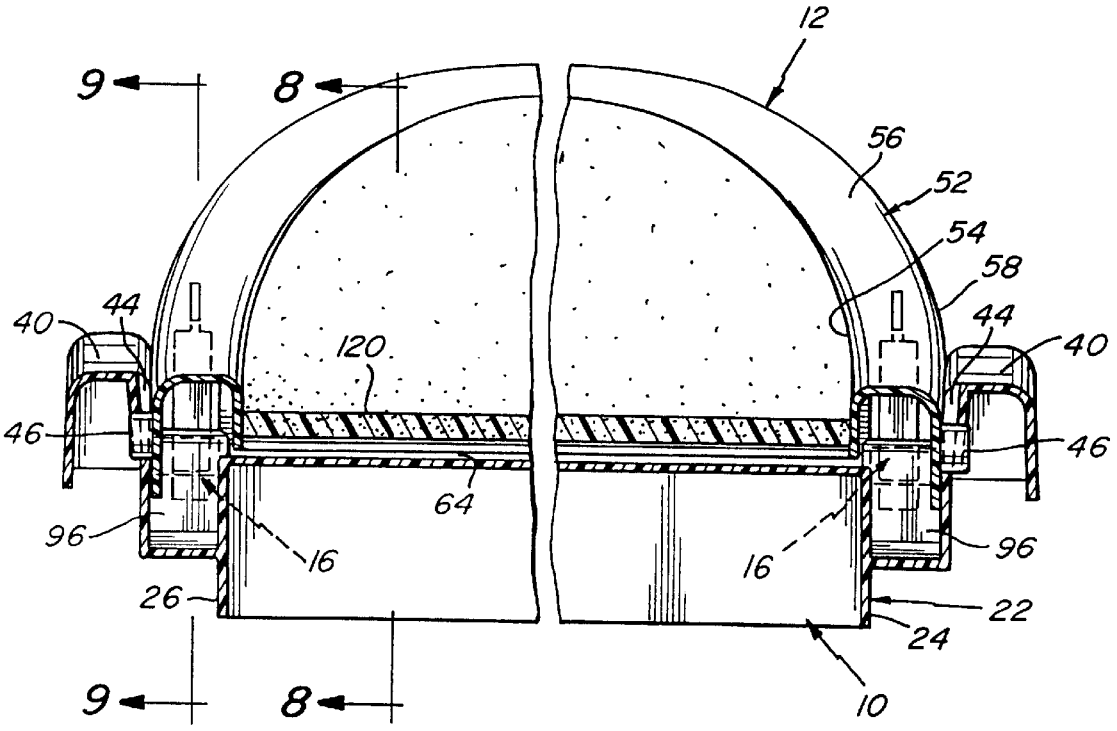
FIG. 7 is a fragmentary cross-sectional view on an enlarged scale taken along the section line 7—7 of FIG. 2.

The headrest 12 has a supporting surface 50 and a surrounding rim 52. The rim 52 includes an inner vertical wall 54, a top wall 56 and skirt 58 which is generally parallel to the inner wall 54. The inner wall 54 extends upwardly from the periphery of the supporting surface 50 and diminishes in height toward the center of high end of the rim as is clearly shown in FIGS. 1 and 4. The hinge pins 46 that fit into the slots 44 are carried on the ends of the skirt 58 shown in FIG. 7. When the headrest 12 is in the operative position shown in FIGS. 1 and 4, the supporting surface of the headrest 50 forms a smooth continuation of the supporting surface 38 of the base. The surface 50 of the headrest extends over the upper wall 60 of shoulder 62 at the head end of the base (see FIGS. 4 and 8), and a slight cavity 64 is provided where the wall 60 and supporting surface 38 join one another adjacent the lower end 66 of surface 50. That cavity 64 receives the fold of the pad which lines the tub, as described more fully below.

The rim 52 of headrest 12 defines a cavity 70 at each end that house the latches 16 that lock the headrest in the operative or extended position of FIG. 1. The latch 16 is mounted in the cavity 70 by means of a slot channel 72 molded as an integral part of the rim 52 of headrest 12 as best shown in FIGS. 9 and 10. The slot 72 is defined by a pair of side walls 74 and bottom wall 76, and the slot receives the split mounting bracket 78. Once inserted in place, the bracket is essentially immovably retained in position by the barb 80 of tine 82 of bracket 78 and by the shoulder 84 of the other tine 86 of the bracket. The bracket is formed as an integral part of the latch 16. Latch 16 also includes a spring-like post 90 that extends downwardly from bracket 78, and which carries a hook 92 and an actuator handle 94. As shown in FIG. 9, the hook 92 is designed to engage lip 91 of a pocket wall 96 at the head end of the base 10 beneath the supporting surface 38. The flexible support 90 of the latch 16 enables the hook 92 to be disengaged from the pocket 96 simply by pressing upwardly on the handle 94 so as to move the hook to the position shown in broken lines in FIG. 9. When the hook is disengaged in that fashion, the headrest 12 may be pivoted on the hinge pins 46 to the folded position shown in FIG. 11.

The leg rest 14 includes a supporting surface 100 and a surrounding rim 102 somewhat similar to the rim 52 of the headrest. The surface 100 is provided with a well 104 that is large enough to hold bath accessories such as a wash cloth, soap, etc. The rim 102 includes an inner vertical wall 106, outer wall 108 and horizontal wall 110 that together define an inverted channel 112 for housing that latches 18 that releasably lock the leg rest in the extended position. The latches 18 carried by the leg rest are identical to the latches 16 in the headrest, and they need not be described again. They are mounted in the same fashion as the latches in the headrest and engage latching pockets 114 shown in FIG. 3. As is also shown in that figure, the hinge pins 46 on the leg rest are carried on the outside wall 108 at each end of that wall, and extend into the slots 44 at the adjacent ends of the side walls 36 of the base 10.

As shown in FIG. 4, when the leg rest 14 is in the extended position, the shelf or supporting surface 100 of the leg rest adjacent the base overlaps the supporting surface 38 of the base. Furthermore, in the extended position, the surface 100 is essentially horizontal so that the infant's heels and or lower legs may rest comfortably on the leg rest with legs slightly bent at the knee when the baby's buttocks are in the lowest part of the surface 38 of the base.

As is clearly shown in FIGS. 1, 4, 6 and 7, a sponge pad 120 made of foam plastic or other suitable material which is mildew resistant, covers the supporting surface 50 of the headrest, the supporting surface 38 of the base and overlaps a portion of the surface 100 of the leg rest. The pad provides a very comfortable surface for the baby placed in the tub. The pad 120 also acts as a shingle over the juncture of the surfaces [150] *50* and 100 of the headrest and leg rest with the adjacent ends of the surface 38 of the base. The pad 120 is secured to the base 10, headrest 12 and leg rest 14 by transverse application of adhesive 122, 124 and 126, *preventing water from dripping through the connection and directing water into the reservoir*. These applications of adhesive however are spaced from the hinge connections between the three parts so as not to interfere with the folding of the tub. The pad 120 does not interfere with the folding of the leg rest 14 and headrest 12 to the retracted position *closely adjacent the base*. Any bulging at the fold between the base 10 and headrest 12 may be accommodated in the cavity 64.

Figure 6:
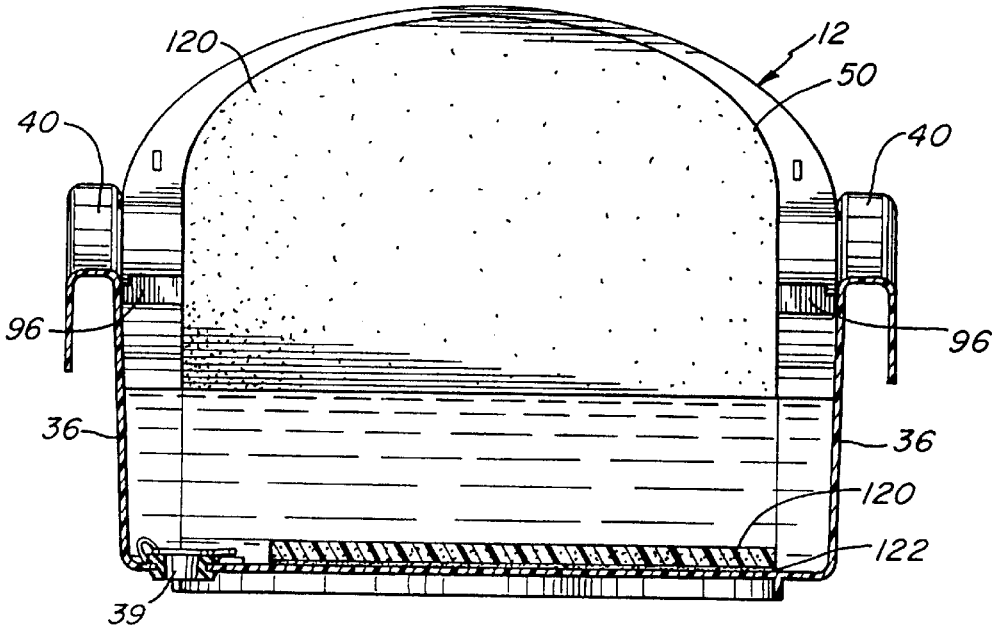
FIG. 6 is a transverse cross-sectional view of the bathtub on an enlarged scale taken along the section line 6—6 in FIG. 2.
Figure 12:
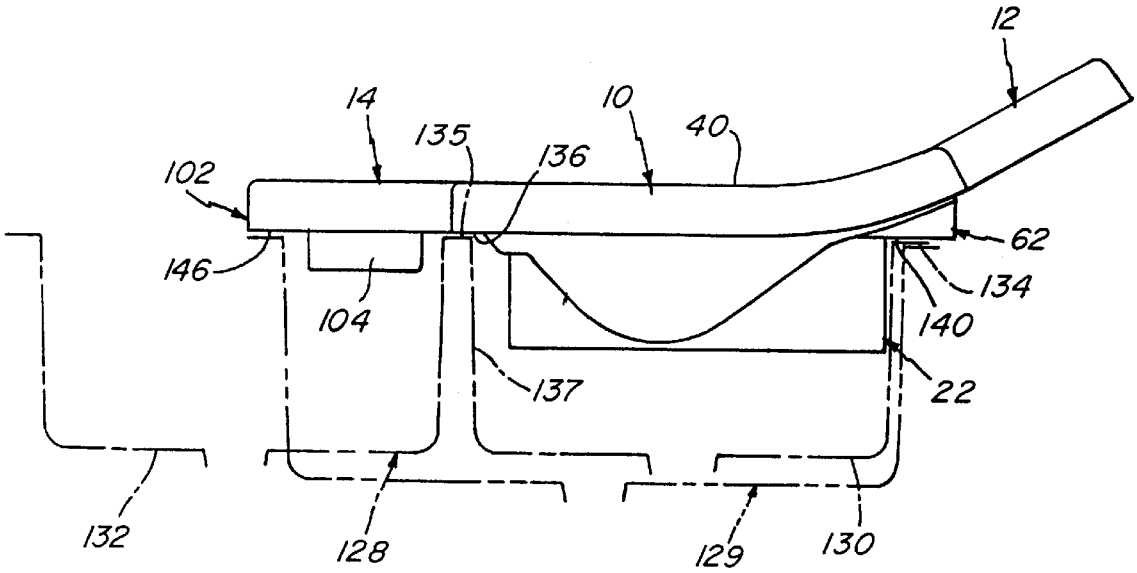
FIG. 12 is a schematic view showing the baby bathtub of the present invention as it fits in a single or double sink, the sinks being shown superimposed in broken lines.

In FIG. 12 the baby bathtub of the present invention shown in its extended or operative configuration is schematically depicted as it may be placed in either a double kitchen sink 128 or a larger single tub sink 129. Placed in a typical double kitchen sink having tubs 130 and 132, the shoulder 62 at the head end of the base 10 is shown to rest on the lip 134 at the right end of tub 130 while the foot end 136 of the base which is coplanar with the bottom edge 140 of shoulder 62 rests on the top 135 of the left side *of* basin 130, *which is also* the wall 137 between the two basins 130 and 132. In that position the leg rest 14 extends above the basin 132 in cantilever fashion and is held in that position by the latch 18 (not shown in FIG. 12). Referring to the same figure, the single tub sink 129 will support the end of the leg rest 14 by means of the shoulder 146 defined by the skirt 102 of the leg rest to the left of the well [140] *104*. Thus, the baby bathtub of this invention may be used either on a flat surface such as a table or counter top supported in place by the rim 22 on the base or in a single or double sink by means of the shoulder 62 at the head end of the base and either the shoulder 136 at the foot end of the base or the shoulder 146 at the extreme end of the leg rest. It will also be evident from the foregoing description that the baby bathtub of the present invention while providing a large reservoir full of water as shown in FIGS. 4 and 6, is very compact as its head and foot ends may be folded over in the manner shown in FIG. 11 for carrying or storage. Furthermore, the baby bathtub has a convenient well at the leg rest for holding bath accessories when the device is in use.

Having described this invention in detail those skilled in the art will appreciated that many modifications may be made of this invention without departing from its spirit. Therefore, it is not intended that the breadth of the invention be limited to the specific embodiment illustrated and described. Rather, the scope of the invention is to be determined by the appended claims and their equivalents.

What is claimed is:

1. A baby bathtub comprising:

a base having a support on which the base may stand on a flat surface and having an upwardly open contoured reservoir for receiving a baby's torso, said base having a foot end and a head end and a pair of side walls, said base having a rim that extends beyond the support at the foot and head ends for supporting the tub from the rim in a [sinks] *sink*, a leg rest pivotally connected to the foot end of the base and movable between an extended position wherein it extends away from the base beyond the foot end and for supporting the feet of a baby positioned with its torso in the reservoir and a folded position wherein it overlies the base, and a headrest pivotally connected to the head end of the base and movable between an extended position wherein it extends away from the base beyond the head and for supporting the head of a baby positioned with its torso in the reservoir and a folded position wherein the headrest overlies the base, said leg rest and headrest in the folded position being compact so that the bathtub is easy to tote and store.

2. A baby bath tub as defined in claim 1 wherein hinges pivotally connect the leg rest and headrest to the base, and latches are mounted [in] adjacent the hinges for releasably locking the leg rest and headrest in the extended positions.

3. A baby bathtub as defined in claim 1 wherein the headrest and leg rest lie in an area defined by the perimeter of the base when they are in their folded positions.

4. A baby bathtub as defined in claim 2 wherein the latches are mounted on the headrest and leg rest and engage the base in the latching position.

5. A baby bathtub as defined in claim 1 wherein a pad is secured to the head rest and base on which the baby lies when placed in the bathtub.

6. A baby bathtub as defined in claim [1] *5* wherein the pad overlies the pivotal connection between the base and headrest for preventing water from dripping through the connection and directing water into the reservoir.

7. A baby bathtub as defined in claim 5 wherein the pad is [permanently] secured to both the headrest and base.

8. A baby bathtub as defined in claim 1 wherein a pad is secured to the base, leg rest and headrest and overlies the pivotal connection between them [for preventing water from dripping through the connections].

[9. A baby bathtub as defined in claim 8 wherein a pad is secured to the base, leg rest and headrest for providing comfort for a baby in the bathtub.]

10. A baby bathtub as defined in claim 1 wherein

[a well is provided in] *at least* one of the leg rest, headrest and base *includes a well* for holding [both] *bath* accessories.

11. A baby bathtub as defined in claim 10 wherein a drain is provided in the reservoir for draining it.

12. A baby bathtub comprising:

a rigid, molded plastic base defining a reservoir having an upper surface for supporting a baby in the bathtub, a rigid, molded plastic headrest movably connected to the base at one end thereof and having an upper head supporting surface, the headrest being movable between a folded position wherein the head supporting surface lies closely adjacent to the base and an extended position for supporting a baby's head when lying on the upper surface of the base, and a rigid, molded plastic legrest movably connected to the base at an opposite end thereof and having an upper leg supporting surface, the legrest being movable between a folded position wherein the leg supporting surface lies closely adjacent to the base and an extended position for supporting a baby's leg when lying on the upper surface of the base.

13. A baby bathtub as in claim 12 wherein the bathtub is convenient for toting and storage when in the folded position.

14. A baby bathtub as in claim 13 wherein latches interconnect the base and headrest as well as the base and legrest for releasably locking the legrest and base as well as the headrest and base in their extended position.

15. A baby bathtub as in claim 14 wherein the latches are disposed on an underside of the bathtub to be inaccessible to the baby while in the bathtub.

16. A baby bathtub as in claim 13 wherein the headrest and legrest are each pivotally connected to the base.

17. A baby bathtub as defined in claim 12 [wherein latches interconnect] *further comprising a first latch connecting* the base and *the legrest for releasably locking the leg rest in the extended position, and a second latch connecting the base and the* headrest [as well as the base and the legrest] for releasably locking the [legrest and base, as well as the] headrest [and base] in [their] *the* extended [positions] *position*.

18. A baby bathtub as in claim 17 wherein the latches are disposed on an underside of the bathtub to be inaccessible to the baby while in the bathtub.

19. A baby bathtub as in claim 12 wherein the headrest and legrest are each pivotally connected to the base.

*20. A baby bathtub comprising:*

*a rigid, molded plastic defining a reservoir having an upper surface for supporting a baby in the bathtub,*

*a rigid, molded plastic headrest movably connected to the base at one end thereof and having an upper head supporting surface, the headrest being movable between a retracted position wherein the headrest lies closely adjacent to the base and an extended position for supporting a baby's head when lying on the upper surface of the base, and*

*a rigid, molded plastic movably connected to the base at an opposite end thereof and having an upper leg supporting surface, the legrest being movable between a retracted position for storage and an extended position for supporting a baby's leg when lying on the upper surface of the base.*

*21. A baby bathtub as in claim 20 wherein latches interconnect the base and headrest as well as the base and legrest for releasably locking the legrest and base as well as the headrest and base in their extended position.*

*22. A baby bathtub as in claim 21 wherein the latches are disposed on an underside of the bathtub to be inaccessible to the baby while in the bathtub.*

*23. A baby bathtub as in claim 20 wherein the headrest and legrest lie in an area defined by the perimeter of the base in their retracted position.*

*24. A baby bath tub as defined in claim 20, further comprising a first latch mounted adjacent the first hinge for releasably locking the leg rest in the extended position, and a second latch mounted adjacent the second hinge for releasably locking the head rest in the extended position.*

* * * * *